(12) United States Patent
Anderson et al.

(10) Patent No.: US 7,170,993 B2
(45) Date of Patent: Jan. 30, 2007

(54) METHODS AND APPARATUS FOR AUTOMATED MONITORING AND ACTION TAKING BASED ON DECISION SUPPORT MECHANISM

(75) Inventors: Gregory Anderson, Colleyville, TX (US); Vinod Anupam, Bridgewater, NJ (US); Richard B. Hull, Chatham, NJ (US); Bharat Kumar, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 332 days.

(21) Appl. No.: 10/022,926

(22) Filed: Dec. 18, 2001
(Under 37 CFR 1.47)

(65) Prior Publication Data

US 2003/0053615 A1   Mar. 20, 2003

Related U.S. Application Data (60) Provisional application No. 60/256,727, filed on Dec. 19, 2000.

(51) Int. Cl.
*H04M 3/00* (2006.01)
*H04M 5/00* (2006.01)
*G06Q 99/00* (2006.01)
*G06F 17/00* (2006.01)
*G06F 15/16* (2006.01)
*G06N 5/02* (2006.01)

(52) U.S. Cl. ............... 379/265.09; 379/219; 379/221; 379/266; 705/1; 706/47; 709/227

(58) Field of Classification Search ........... 705/35–38, 705/1; 709/219–222, 227; 379/265.01–265.05, 379/265, 266, 221, 219, 265.09; 707/6; 706/47
See application file for complete search history.

(56) References Cited

U.S. PATENT DOCUMENTS

| | | | |
|---|---|---|---|
| 5,809,212 A | | 9/1998 | Shasha |
| 6,115,462 A | * | 9/2000 | Servi et al. ............ 379/221.06 |
| 6,256,620 B1 | * | 7/2001 | Jawahar et al. ................ 707/2 |
| 6,349,290 B1 | * | 2/2002 | Horowitz et al. ............ 705/35 |
| 6,604,141 B1 | * | 8/2003 | Ventura ...................... 709/227 |
| 6,708,215 B1 | * | 3/2004 | Hingorani et al. .......... 709/229 |

OTHER PUBLICATIONS

Newton, Harry. Newton's Telecom Dictionary. Feb. 2000. Telecom Books. 16th Edition. p. 82.*
U.S. Appl. No. 09/253,190, filed Feb. 19, 1999, G. Dong et al., "Declarative Workflow System Supporting Side-Effects."

(Continued)

*Primary Examiner*—Wing Chan
*Assistant Examiner*—Thjuan P. Knowlin (57) ABSTRACT

Techniques are provided for use in accordance with such systems as web sites operating electronic commerce (e-commerce) applications, interactive voice response (IVR) systems and workflow systems for providing automated monitoring of user activity and personalized action taking based on such activity, in accordance with an on-line decision support mechanism which combines formal and heuristic reasoning. In a web-based system, for example, the on-line decision support provided in accordance with the invention can be used in a wide variety of e-commerce applications requiring automated, real-time, intelligent interventions, including targeted promotions and discounts, assisting with navigation through self-help material, supporting dynamic price negotiations, and even selecting large portions of page content.

20 Claims, 6 Drawing Sheets

OTHER PUBLICATIONS

U.S. Appl. No. 09/253,274, filed Feb. 19, 1999, G. Dong et al., "Data Item Evaluation Based on the Combination of Multiple Factors."

Peter Piatko, "Thinksheet: A Tool for Information Navigation", a dissertation submitted in partial fulfillment of the requirements for the degree of Doctor of Philosophy, Department of Computer Science, New York University, May 1998.

P. Buneman et al., "Comprehension Syntax" SIGMOD Record 23 (1994), pp. 87-96.

P. Buneman et al., "Naturally Embedded Query Languages", Proc. of Int'l. Conf. on Database Theory, 1992, pp. 140-154, published by Springer-Verlag as Lecture Notes in Computer Science vol. 646.

N. Krishnakumar et al., "Managing Heterogeneous Multi-System Tasks to Support Enterprise-Wide Operations", Distributed and Parallel Databases, 3, 1-33 (1995).

D. Stott Parker et al., "SVP—A Model Capturing Sets, Steams and Parallelism", Proceedings of the 18th VLDB Conference, Vancouver, British Columbia, Canada, pp. 115-126, 1992.

J.A. Miller et al., "WebWork: METEOR$_2$'s Web-Based Workflow Management System", Journal of Intelligent Information Systems, pp. 1-30 (1997).

V.S. Subrahmanian, "Amalgamating Knowledge Bases", ACM Transactions on Database Systems, (TODS) 19(2): pp. 291-331 (1994).

* cited by examiner

| | SESSION ID | PAGE | BUSINESS VALUE | FRUSTRATION SCORE | OPPORTUNITY SCORE | MIHU SCORE | OVERRIDE SCORE | CSR LOAD | OFFER MIHU |
|---|---|---|---|---|---|---|---|---|---|
| 59 | 250 | 1 | 70 | 6 | 0 | 46 | 0 | 80 | FALSE |
| 60 | 250 | 2 | 70 | 14 | 0 | 54 | 0 | 81 | FALSE |
| 61 | 250 | 3 | 70 | 20 | 0 | 60 | 0 | 81 | FALSE |
| 62 | 250 | 4 | 70 | 24 | 0 | 64 | 0 | 79 | FALSE |
| 63 | 250 | 5 | 85 | 8 | 51 | 83 | 0 | 78 | TRUE |
| 64 | 282 | 1 | 40 | 6 | 0 | 25 | 0 | 83 | FALSE |
| 65 | 282 | 2 | 40 | – | – | – | 0 | 82 | FALSE |
| 66 | 282 | 3 | 57 | 16 | 29 | 43 | 90 | 82 | TRUE |
| 67 | 282 | 4 | 57 | – | – | – | – | – | – |
| 68 | 282 | 5 | 57 | 19 | 37 | 58 | – | – | – |
| 69 | 282 | 6 | 71 | 25 | 48 | 58 | – | – | – |
| 70 | 282 | 7 | 71 | | | | | | |

(Column labels: 50, 51, 52, 53, 54, 55, 56, 57, 58)

| STRATEGY | CONVERTING LEGACY SITES EASY | HTTPS HANDLED | HTTP RESPONSE TRANSFORMATION REQUIRED | HTTP RESPONSE PARSING REQUIRED |
|---|---|---|---|---|
| CONTENT GENERATION SCRIPTS SEND HIGH-LEVEL SEMANTICS TO ENGINE | NO | YES | NO | NO |
| CONTENT GENERATION SCRIPTS SEND RAW HTML TO ENGINE | YES | YES | NO | YES |
| WRAPPER SCRIPTS | YES | YES | MAYBE | YES |
| PROXIES | YES | NO | NO | YES |
| WEB SERVER EXTENSIONS | YES | YES | NO | NO |

FIG. 7

METHODS AND APPARATUS FOR AUTOMATED MONITORING AND ACTION TAKING BASED ON DECISION SUPPORT MECHANISM

CROSS REFERENCE TO RELATED APPLICATIONS

This application claims priority to the U.S. provisional patent application identified by Ser. No. 60/256,727, filed on Dec. 19, 2000, and entitled "Personalizing E-Commerce Applications with On-Line Heuristic Decisions," the disclosure of which is incorporated by reference herein.

FIELD OF THE INVENTION

The present invention relates to user-interactive computing systems and, more particularly, to techniques for automated monitoring of user activity and personalized action taking based on such activity, in accordance with a decision support mechanism.

BACKGROUND OF THE INVENTION

The advent of electronic commerce (e-commerce) is forcing radical changes to the landscape of marketing and customer care. E-commerce customers are demanding increased flexibility and convenience in accessing on-line information about products, in ordering them, and obtaining service for them. At the same time, e-commerce businesses are attempting to support: (a) personalized marketing and service to large masses of people, including intelligent targeted advertising, and intelligent mechanisms to identify and take advantage of profitable and loyal customers; and (b) meaningful dialogues with customers so that quality of service can be improved before customers switch to a competitor. These needs are not restricted to "business-to-customer" (B2C) e-commerce web sites. Web sites in "business-to-business" (B2B) e-commerce that are accessed by employees of a business must also provide effective, personalized service.

In response, some e-commerce sites have proposed the use of rule-based mechanisms to assist in addressing the needs of participants, as well as their own needs, in personalizing their e-commerce applications to particular users. However, existing e-commerce personalization tools that utilize such rule-based mechanisms typically use rule languages that are quite limited.

For example, iContact (from !hey Inc. of North Andover, Mass.) uses a simple rules mechanism to identify customer sessions in an e-commerce application that are "good" candidates for live customer service representative (CSR) assistance. However, with iContact, the CSRs are given a listing of these candidates, and the CSRs make the final decision about whether or not to offer live intervention. Thus, with such an arrangement, the decision is made by a human operator. The iContact system, as with other existing approaches, also do not provide automated mechanisms for offering discounts or other options to customers.

In addition to e-commerce applications, existing interactive voice response (IVR) systems suffer from similar problems. That is, existing IVR systems do not provide automated mechanisms for evaluating the progress of a customer through an IVR sequence and then deciding whether to intervene by offering live assistance, discounts, or other options to the customer.

Still further, one may generally view existing workflow systems as suffering from analogous problems. As is known, a workflow system is a computer system which dictates how various classes of objects should be handled. Objects may include, for example, an incoming call to a call center, insurance claims arriving at a claim center, request for information from a web site, etc. As such, web servers that implement e-commerce applications and computer systems that implement IVR systems may be thought of as examples of workflow systems.

Thus, there is a need for techniques for use in accordance with such systems as e-commerce applications, IVR systems and workflow systems which provide automated monitoring of user activity and personalized action taking based on such activity, in accordance with a decision support mechanism.

SUMMARY OF THE INVENTION

The present invention provides techniques for use in accordance with such systems as e-commerce applications, IVR systems and workflow systems which provide automated monitoring of user activity and personalized action taking based on such activity, in accordance with a decision support mechanism.

In one aspect of the invention, an automated technique for use in accordance with a user-interactive processing system comprises the following automated steps. First, one or more interactions that a user has with one or more applications associated with the processing system are monitored. Next, data obtained in association with the monitoring operation is processed to compute a decision value representative of whether or not the user may need intervention with respect to the one or more applications. Then, the intervention is proactively or automatically offered to the user when the computed decision value represents a result indicative that the user is likely to need the intervention.

The proactively offered intervention may comprise assistance provided by an individual through a communication channel established between the user and the individual in accordance with the user-interactive processing system. This may be a connection over a standard telephone line or a connection over a network with which the user interacts with the one or more applications of the processing system.

In one embodiment, the user-interactive processing system comprises one or more servers having one or more electronic commerce-based applications executing in association therewith. In the case where the network is the Internet or the World Wide Web, the one or more servers may form a web storefront. However, in alternative embodiments, the user-interactive processing system may comprise an interactive voice response (IVR) system, or even a workflow system such as a back-office type workflow system wherein appropriate notifications or other actions are invoked if a given workflow enactment will be delayed beyond some threshold or will otherwise violate some criterion.

In another aspect of the invention, apparatus for use in accordance with a user-interactive processing system comprises at least one processor coupled to the user-interactive processing system and operative to: (i) process data obtained in association with one or more interactions a user has with one or more applications associated with the processing system to compute a decision value representative of whether or not the user may need intervention with respect to the one or more applications; and (iii) proactively cause the offering of the intervention to the user when the computed decision value represents a result indicative that the user is likely to need the intervention. The apparatus may also comprise memory, coupled to the at least one processor, for storing at least one of the obtained data and the computed decision value. The invention may also comprise a machine readable medium containing one or more programs which when executed implement the above operations performed by the processor.

In one embodiment, the processor comprises a rule-based decision engine, which may preferably be based on at least one of formal and heuristic reasoning such as the so-called "Vortex" engine described further herein. The data obtained may be raw data and/or semantic information.

In yet another aspect of the invention, a network-based system comprises at least one server operative to execute one or more electronic commerce-based applications for use by at least one customer via a network. The system also comprises at least one decision engine coupled to the at least one server and operative to: (i) process data obtained in association with one or more interactions the customer has with the one or more electronic commerce-based applications to compute a decision value representative of whether or not an action should be taken with respect to the customer; and (ii) proactively taking the action with respect to the customer when the computed decision value represents a result indicative that the action should be taken with respect to the customer.

More specific to the electronic commerce or web-based application, the proactively taken action may comprise offering assistance provided by a customer service representative (CSR) through a communication channel established between the customer and the customer service representative in accordance with the at least one server. Alternatively, the proactively taken action may comprise presenting to the user data relevant to the one or more electronic commerce-based applications, wherein the relevant data is related to options available to the customer.

Still in the web storefront context, the computed decision value may be based on one or more attributes comprising: (i) an attribute representative of a business value associated with the customer or the one or more applications; (ii) an attribute representative of a frustration level attributable to the customer with respect to the one or more interactions; (iii) an attribute representative of an estimated profit opportunity associated with the customer; and/or (iv) an attribute representative of availability of resources capable of taking the action.

The system may further comprise one or more client computing devices coupled to the at least one server for use by the customer in interacting with the at least one server, and at least one database coupled to the at least one decision engine for use in obtaining data to be processed by the decision engine.

Advantageously, in a web-based system for example, the on-line decision support provided in accordance with the invention can be used in a wide variety of e-commerce applications requiring automated, real-time, intelligent interventions, including carefully targeted promotions (e.g., free shipping) and discounts, assisting with navigation through self-help material, supporting dynamic price negotiations, and even selecting large portions of page content.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

The present invention will be explained below in the context of an illustrative Internet-based (or World Wide Web-based) e-commerce application, also referred to as a "web storefront." However, it is to be understood that the present invention is not so limited. Rather, as will be evident, the techniques of the invention may be more generally applied to improve automated monitoring and automated action taking based on a decision support mechanism in any computing system, e.g., IVR systems, workflow systems, etc.

More particularly, in a preferred embodiment, the present invention introduces a new approach to personalizing web-based e-commerce sites based on the use of automated on-line decision support. In a preferred embodiment, this is accomplished by adapting a rules-based decision engine, called the "Vortex" decision engine, for use in an automated monitoring and action taking system. The Vortex engine implements a language for specifying decisions, that supports flowchart constructs and a specialized construct called "decision flow," and that combines rules-based constructs and a variety of specialized constructs to facilitate reasoning based on both heuristics and partial information.

Such a decision engine and accompanying language is disclosed in U.S. patent applications respectively identified as: Ser. No. 09/253,190 (G. Dong 1-4-3-1-3) and entitled "Declarative Workflow System Supporting Side-Effects;" and Ser. No. 09/253,274 (G. Dong 2-7-5-3-2-2-5) and entitled "Data Item Evaluation Based on the Combination of Multiple Factors," both concurrently filed on Feb. 19, 1999, the disclosures of which are incorporated by reference herein.

While a decision support engine such as the Vortex engine is preferred, it is to be understood that other mechanisms may be adapted and employed to provide decision support in accordance with the teachings of the invention. For example, a decision engine based on flowchart constructs and event-condition-action rules, such as provided by the Blaze Adviser product from HNC Software in San Jose, Calif., may be employed. Alternatively, an expert system such as OPS5, as described in L. Brownston et al., "Programming Expert Systems in OPS5: An Introduction to Rule-based Programming," Addison-Wesley, Reading, Mass., 1985, the disclosure of which is incorporated by reference herein, may be employed. Still further, decisions may be specified using a conventional programming language such as Java or C++.

Automated monitoring and action taking techniques of the invention are illustrated herein in accordance with a system referred to as the "May-I-Help-You" or MIHU system that, among other features to be described, proactively offers live assistance to web storefront customers.

The present invention realizes that a preferred way to support personalization through on-line decision support is by a high-level language for specifying decisions that supports sophisticated reasoning but which at the same time is accessible to business analysts and managers. The following is a partial list of items that would be desirable from such a decision support language:

(a) Ability to use both formal (e.g., chaining of rules) and heuristic (e.g., giving scores based on ad hoc combinations of various factors) styles of reasoning;
(b) Ability to use rules where appropriate, and to use flowchart constructs where appropriate;
(c) Ability to work with partial and/or incomplete information;
(d) Possibility for hierarchical, modular structuring;
(e) Ability to bring in outside information (e.g., access to customer profiles, the results of bulk statistical analysis);
(f) Ability to invoke side-effect functions (e.g., database updates, triggering workflows);
(g) A clear and intuitively natural semantics;
(h) A natural correspondence between reports on decisions made and the structure of how the decisions are specified (i.e., primarily the structure of the rule sets); and
(i) The language can be "owned" or controlled by business analysts and managers, without relying on programmers that translate the decision specifications into a highly technical format;
(j) The on-line decision engine should permit changes to decision specifications with no interruption in service; and
(k) User-friendly authoring of decision policies, including rules.

The Vortex engine is able to meet these needs in the context of its associated paradigm for specifying decisions. An important aspect of the Vortex paradigm is the notion of "decision flow," which is a combination of rules constructs and workflow-like constructs. In a decision flow, emphasis is on computing attribute values. In accordance with the invention, some of these are targets of the decision (e.g., should a discount be offered to a customer) and others are intermediate to the decision (e.g., the likelihood that this customer will leave the site before completing the deal). Rules may be used to compute the values of individual attributes, and rules may be used to control what attributes are to be computed. For example, attributes not relevant to a specific decision can be ignored. Reports about decisions made can show the values of the target and intermediate attributes, and have structure close to the structure of the decision flow.

Decision flows as applied in the Vortex engine permit complex reasoning about a broad array of data about web sessions and customers. To take full advantage of this, it is preferred to have access to rich information about the pages a customer is visiting, including the underlying intent of the pages (e.g., is it a catalog page, an instructions page, a shopping cart page) and the content delivered in them (e.g., what is the quality of a search result). Different approaches for gaining access to that information are described below.

As mentioned, the MIHU system is presented as a preferred embodiment of an automated monitoring and action taking system of the invention. This system is aimed at reducing the number of abandoned e-commerce transactions. Industry statistics indicate that in the U.S. market, for every online B2C transaction that is completed, there are nearly four times as many that are abandoned. Further, 7.8% of the abandoned transactions could be converted into sales by using live customer service representative (CSR) interaction. This translated into $6.1 billion in lost e-commerce sales in 1999, and could lead to a cumulative loss of more than $173 billion in the subsequent 5-year period.

The MIHU system monitors a customer's progress through a web storefront, and uses stored and real-time information to infer values such as the current business value of the session and the frustration level of the customer. The MIHU system can proactively offer the customer discounts or targeted promotions. Further, the MIHU system can offer the customer a "May I Help You" window, which invites the customer to interact with a live CSR, through text chat, voice chat, and/or escorted web browsing. As will be seen, a decision server of the MIHU system accesses both stored information and real-time information, including the current availability of, and load on, the CSRs.

The approach offered by the invention can be used in a wide variety of e-commerce applications involving personalization and customization including, by way of example only, the offering of carefully targeted promotions and discounts, helping with navigation through catalogs or self-help material, guiding a customer through an ordering process, and conducting automated dialogues with the customer. It can also be used in non-commercial web-based applications, including context-aware searching tools and automated customization of portals. One of ordinary skill in the art will realize various other applications with which the teachings of the invention may be implemented.

The remainder of the detailed description will be organized as follows: Section I describes the MIHU system in accordance with a preferred embodiment; section II describes the Vortex and decision flow paradigms and illustrates their use in connection with the MIHU system; and section III describes approaches for incorporating on-line decision servers, such as the Vortex engine, into web-based e-commerce sites.

I. MIHU System

In a department store, customers are free to browse. In a good department store, a salesperson will sometimes approach customers with the gentle question "May I help you?" In an excellent department store, the timing and manner in which this question is asked is guided largely by the browsing behavior of the customer. The MIHU system provides a functionality for web-based storefronts that is analogous to this kind of service in excellent department stores. The MIHU system has at least one important advantage over a department store salesperson, which is that many e-commerce businesses know the identity of customers during their visits on the web.

MIHU is a customer relationship management system that interfaces to a business' web storefront. MIHU can keep track of the interaction of a customer with the storefront. For example, using a high-level rules-based language such as the Vortex language, as described herein, business analysts and managers can program the MIHU system to use customer interaction information (e.g., shopping cart content, sequence of pages visited), coupled with information available in enterprise databases (e.g., customer profile, contact history, current orders, and results from off-line decision support tools) to build a model of the customer and the current interaction.

Based on the individual characteristics of each customer interaction, MIHU may choose to present to the customer an icon or window offering help relevant to the current context. This help may be totally computer-controlled or it may be an offer to chat with a live CSR. In the first case, if the customer takes up the offer (e.g., by clicking on the icon or window), then appropriate context-dependent information is delivered to the customer. In the second case, a CSR is assigned, appropriate information is forwarded to that CSR, and some kind of interaction with the customer is initiated. Of course, providing live CSR help with an interactive session brings with it the opportunity to help close the sale, and also the opportunity to attempt cross-sells or up-sells.

We now describe the MIHU system according to an embodiment of the present invention, which provides the above functionality. This section presents the overall architecture of the system, while the following sections describe details on the kinds of on-line decisions that can be used and approaches to integrating the web site with the on-line decision server.

Figure 1:
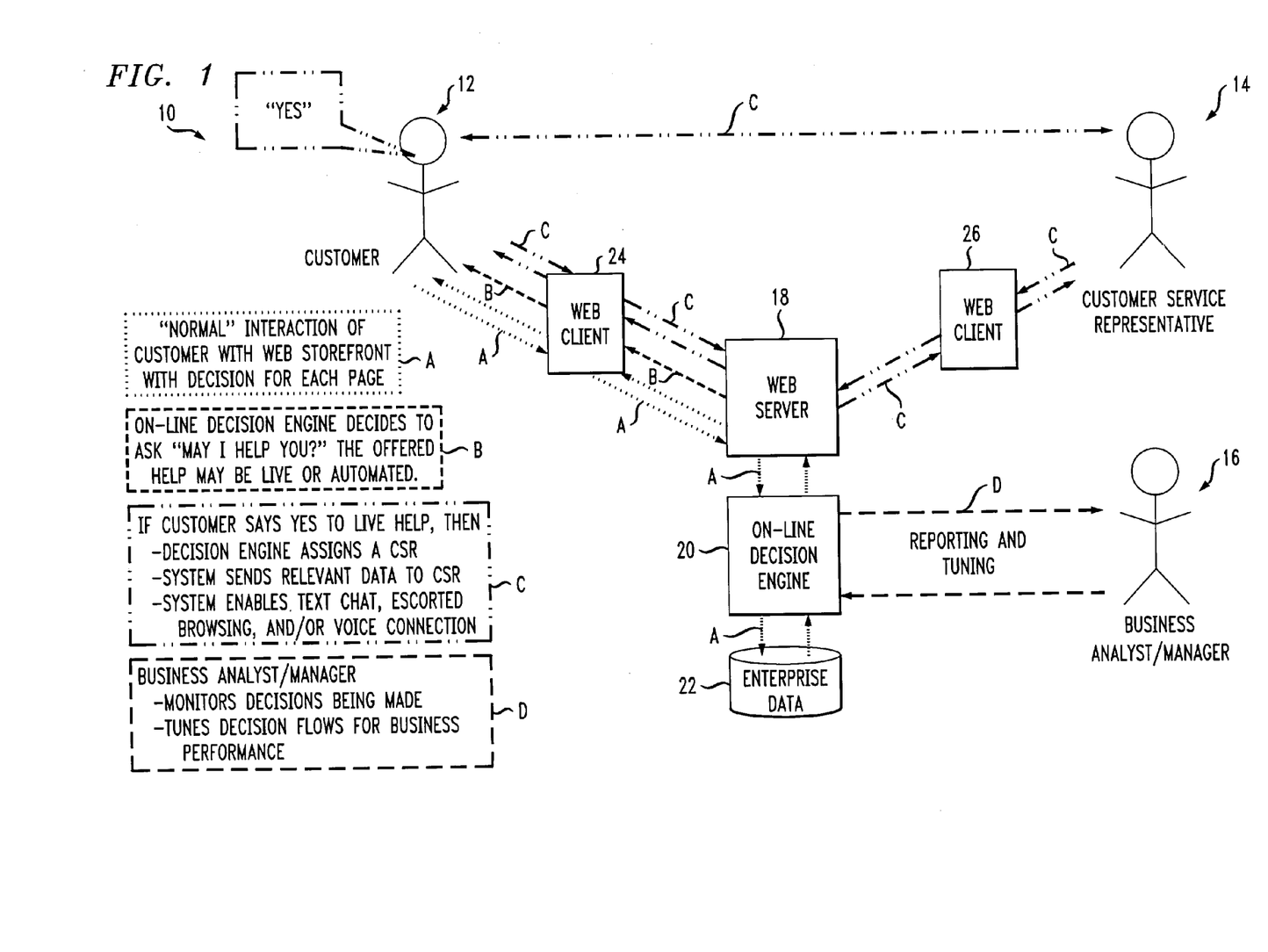
FIG. 1 is a block/flow diagram illustrating an automated monitoring and action taking system and its associated operations according to an embodiment of the invention, in this case, a MIHU system.

Referring initially to FIG. 1, a block/flow diagram illustrates an automated monitoring and action taking system and its associated operations according to an embodiment of the invention, in this case, a MIHU system. As depicted in FIG. 1, operations in accordance with the MIHU system 10 may involve a customer 12, a customer service representative 14, and a business analyst/manager 16. Of course, the system may support more than one customer, more than one customer service representative, and/or more than one business analyst/manager. Only one of each type of individual is shown for the sake of simplicity.

As shown, the MIHU system 10 comprises a web server 18, an on-line decision engine 20, an enterprise database 22, a web client device 24 (for use by customer 12), and a web client device 26 (for use by CSR 14). Again, for the sake of simplicity, only one computing system of each type is shown in FIG. 1. However, it is to be readily understood that in a MIHU system according to the invention there may be more than two web client devices, more than one web server (e.g., web server farm), more than one decision engine (e.g., a decision engine farm), and more than one enterprise database.

It is to be appreciated that while the illustrative system shown in FIG. 1 includes a web server as the user-interactive processing system with which the on-line decision engine operates, the same inventive principles described herein are applicable to the user-interactive processing system being an IVR system or any workflow type system.

FIG. 1 illustratively summarizes the operation of a MIHU system. There are four phases or aspects to the operation, as illustrated by the flow chart in FIG. 1 and the various data flow lines shown. In the first phase (shown with lines having small dots and marked by the reference letter A) a customer has "normal" interaction with the web storefront. In particular, the web server 18 supporting the storefront presents pages to the customer's web client 24, as is known, and customer 12 fills in blanks and submits page requests to the server 18. However, before the web server 18 presents a new page to the customer, the on-line decision engine 20 is asked whether or not the customer should be presented with the "May I Help You" option (or some other optional assistance or customer service such as a targeted discount). Thus, there is preferably a decision made by the decision engine 20 for each page. The decision server 20 can access information about the customer's current web session from the web server 18 (e.g., pages visited, shopping cart contents), and may access data from an enterprise database 22 (e.g., customer profile, contact history, current orders, and results from off-line decision support tools). The decision server 20 may also gather information from decision engines using alternate reasoning paradigms, such as an expert system or, e.g., a specialized system for determining customer preferences.

The second phase (shown with lines having large dots and marked by the reference letter B) occurs if and when the decision engine 20 determines that the customer 12 should be given the MIHU option. In that case, the web server 20 presents to the customer's client 24 an applet that asks whether the customer would like live assistance from a CSR 14 or automated assistance from the web server 18 (e.g., in the form of a help page or the like). As is known, an applet generally includes one or more software programs that get downloaded to a device and executed thereon in accordance with some related application.

The third phase (shown with lines having dashes and dots and marked by reference letter C) arises if the customer 12 does want assistance. In such case, the decision engine 20 assigns a CSR 14. The assignment may be made based on the availability and the current load associated with each CSR. The web server 18 is then instructed to send data relevant to assisting the customer (e.g., particulars about the current web session that the customer is engaging in and, apparently, having some trouble with) to the assigned CSR. The MIHU system then establishes one, some or all of three forms of interaction between customer 12 and CSR 14: (1) voice conversation; (2) text chat; and (3) "escorted" or "collaborative" web browsing (where the CSR can select a URL and both the CSR and customer clients go to that URL, or visa-versa). The text chat and collaborative web browsing can be accomplished over the customer's web client device 24 and the CSR's web client device 26 via the web server 20, as is known. Voice conversation may be established via a standard telephone line (PSTN) or over the data network (e.g., Internet phone, Voice over IP or VoIP), as is also known.

The fourth phase (shown with lines having dashes and marked by reference letter D) occurs in parallel with the other ones, and at a more deliberate pace. This stage involves reporting and "tuning" for business performance, i.e., the continued examination by a business analyst/manager 16 of the decisions made for the web storefront, with the ultimate goal of making improvements on the underlying decision policies. As will be described below, aspects of the Vortex language make it possible to quickly modify a Vortex program in order to achieve a desired effect. Thus, as indicated in FIG. 1, the business analyst/manager 16 monitors the decisions being made by the decision engine 20 and, if necessary or desired, adjusts decision flows for improved business performance.

While the MIHU system is generally not attempting to obtain any extra information from the customer that is not already available to the web site, the MIHU system may inform the customer that monitoring operations are being performed and, based on the customer's comfort level with such operations, may allow the customer to opt-in when he or she registers with the site.

II. Vortex and Decision Flows

This section presents a detailed description of a preferred form of the on-line decision engine 20 in the MIHU system 10 of FIG. 1. As previously mentioned, a preferred form is the Vortex decision engine and associated rule-based language, as is disclosed in U.S. patent applications respectively identified as: Ser. No. 09/253,190 (G. Dong 1-4-3-1-3) and entitled "Declarative Workflow System Supporting Side-Effects;" and Serial No. 09/253,274 (G. Dong 2-7-5-3-2-2-5) and entitled "Data Item Evaluation Based on the Combination of Multiple Factors," both concurrently filed on Feb. 19, 1999, the disclosures of which are incorporated by reference herein. However, as mentioned above, other mechanisms may be adapted to provide the methodologies of the invention.

In the Vortex engine, programs are essentially flowcharts that may include one or more specialized nodes which contain "decision flows." Since flowchart constructs are well understood, we focus here on decision flows.

A. Vortex Decision Flows

The decision flow paradigm specifies complex reasoning that may involve partial information, heuristics, and multiple styles of combining information. A key criterion in the development of the paradigm was that users other than computer scientists (e.g., business managers, policy analysts, domain experts) should be able to understand the specifications of how decisions will be made, and in some cases be able to modify the specifications directly. Decision flows support a form of incremental decision-making, that can easily incorporate a myriad of business and other factors, and specify the relative weights they should be given. Decision flows support a rule-based style of specifying decision policies, and are more expressive than decision trees and traditional business rule systems. However, decision flows are less expressive than conventional expert systems as a result of an approach to structuring the rule set underlying a decision flow. This helps to simplify explanations of how a decision is made, and reduces the "ripple effect" that often arises from modifications to programs written with expert systems or logic programming languages.

An execution of a decision flow is focused on making a single decision, e.g., should the MIHU functionality be offered to a customer at the current time, or given the history of price negotiation so far what should the next proposal be, or given that the order for customer x is 10 days behind schedule what is the best way to escalate. The Vortex engine can make these and other decisions on demand, in a manner analogous to how a database can answer queries on demand. In contrast, most existing data mining technology is oriented around off-line or bulk decision making.

Figure 2:
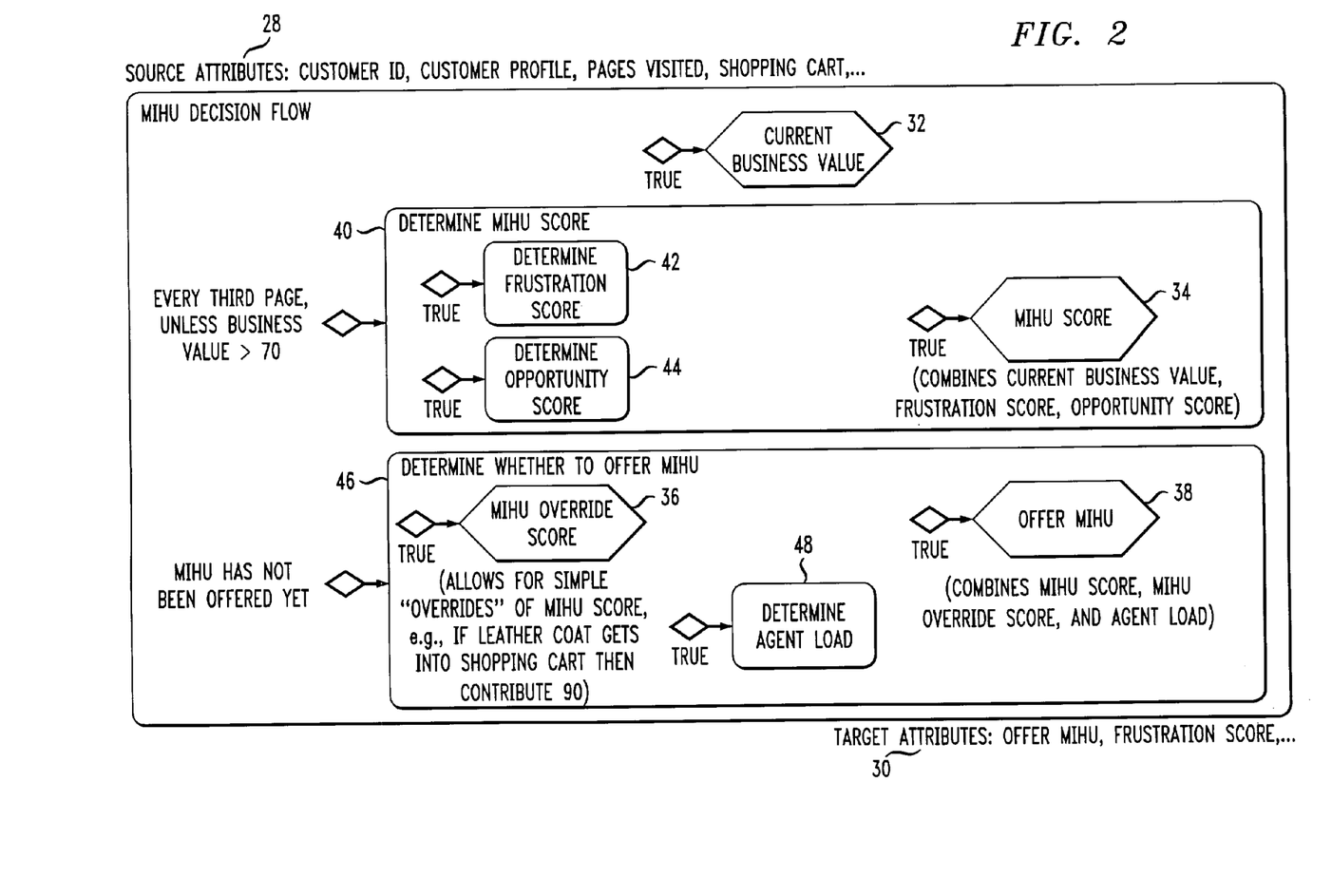
FIG. 2 is a diagram illustrating a representative decision flow structure for making a MIHU decision according to an embodiment of the invention.
Figure 4:
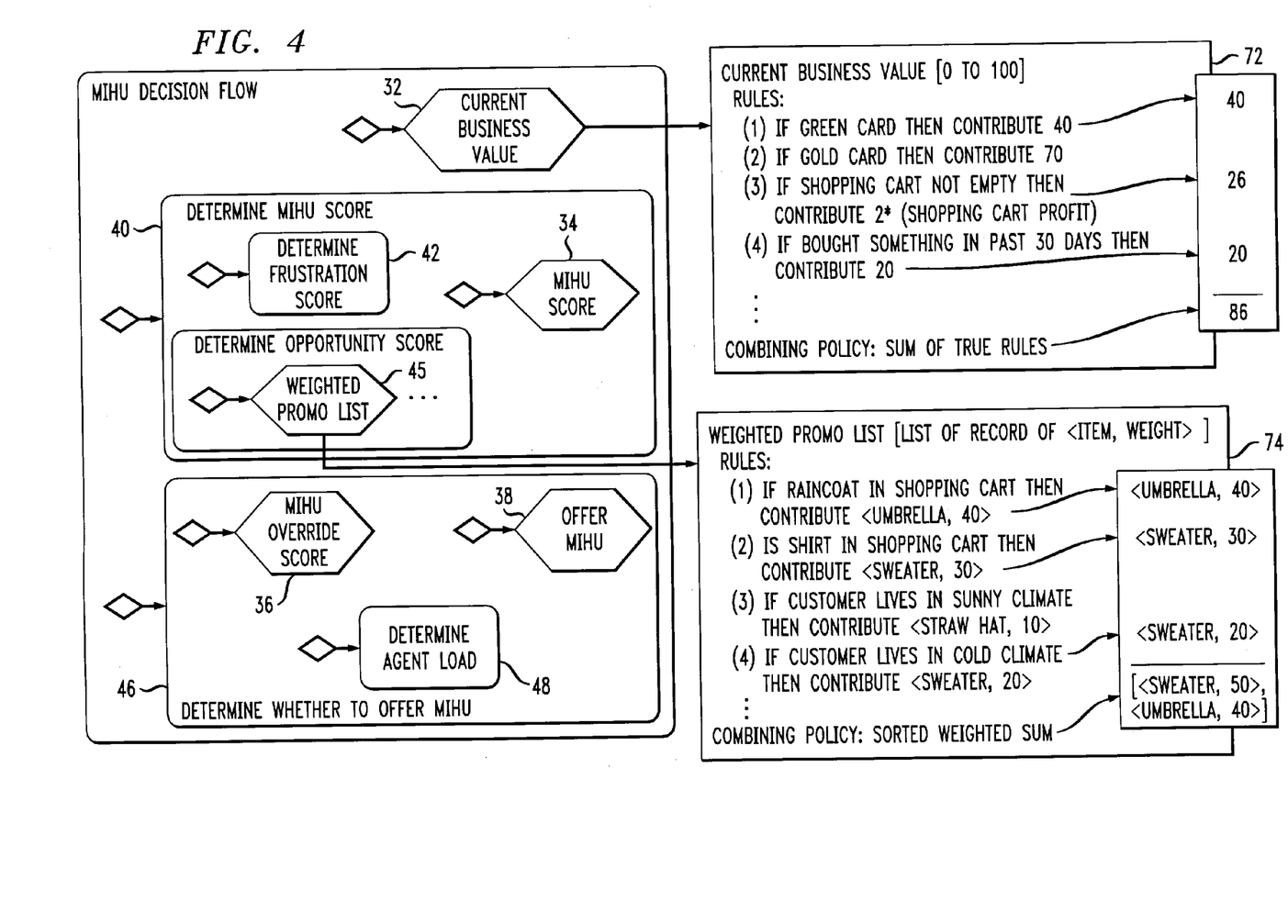
FIG. 4 is a diagram illustrating a representative decision flow structure illustrating attribute rules and combining policies for making a MIHU decision according to an embodiment of the invention.

We illustrate some of the basic decision flow constructs using FIGS. 2 and 4, which give a picture of a representative decision flow that can be used for making a MIHU decision (i.e., whether or not to offer assistance) in the decision engine 20 of FIG. 1. It is to be understood that similar decision flows may be used to make other decisions, such as whether or not to offer discount or targeted advertising, etc.

In the MIHU embodiment, a decision flow like this would be one node of a flowchart which is executed for each page that is served to a customer. For example, this outer flowchart might operate as follows: (a) test whether the page indicates a new session or is the continuation of an active session; (b) if a continuation, then retrieve information (from a main memory database or internal data structure) about previous pages of the session; (c) possibly get customer profile information; (d) execute a decision flow that decides whether to make an automated intervention; and (e) inform the web server about the decision made.

FIGS. 2 and 4 show rules and conditions using an informal, pidgin syntax. In the text-based version of Vortex, the syntax for conditions and terms is close to the C language. A GUI (graphical user interface) is provided for Vortex programmers, including wizards to help with rule construction, query construction, and the like.

Decision flows are "attribute-centric." In particular, a decision flow specification has "source attributes" 28 (FIG. 2) or input parameters. In the example, the source attributes hold information about the customer identification, customer profile and current session. The specification also includes a family of derived attributes, which may be evaluated during execution. Some of the derived attributes will be "targets attributes" 30 (FIG. 2), and embody the output of a decision flow. In the example, the target attributes include a boolean indicating whether to offer the MIHU functionality, and additional attributes giving characteristics of a session. The Vortex engine supports data types associated with relational databases, namely, scalars, tuples of scalars, lists of scalars, and lists of tuples of scalars. The Vortex engine may also incorporate XML (Extensible Markup Language) data.

The decision flow of FIG. 2 shows individual attributes using hexagons (e.g., current business score, offer MIHU), and modules using rounded-corner boxes (e.g., determine MIHU score, determine frustration score). Attributes shown in FIG. 2 include "current business score" (or value) 32, "MIHU override score" 36, and "offer MIHU" attribute 36. Modules shown in FIG. 2 include "determine MIHU score" module 40 which includes "determine frustration score" 42 and a "determine opportunity score" 44, and a "determine whether to offer MIHU" module 46 which includes a "determine agent (CSR) load" module 48. The interaction and functionality of these attributes and modules will be explained below in the context of FIG. 3.

A hexagon node may contain rules that specify how an attribute is to be computed. This will be described below in subsection B. External functions such as database queries, calls to a alternative decision support system (e.g., an expert system), or side-effect functions (e.g., database updates, triggering workflows) can also be included. The modules may be hierarchically organized, and may contain other modules, hexagons, and external functions.

Figure 3:
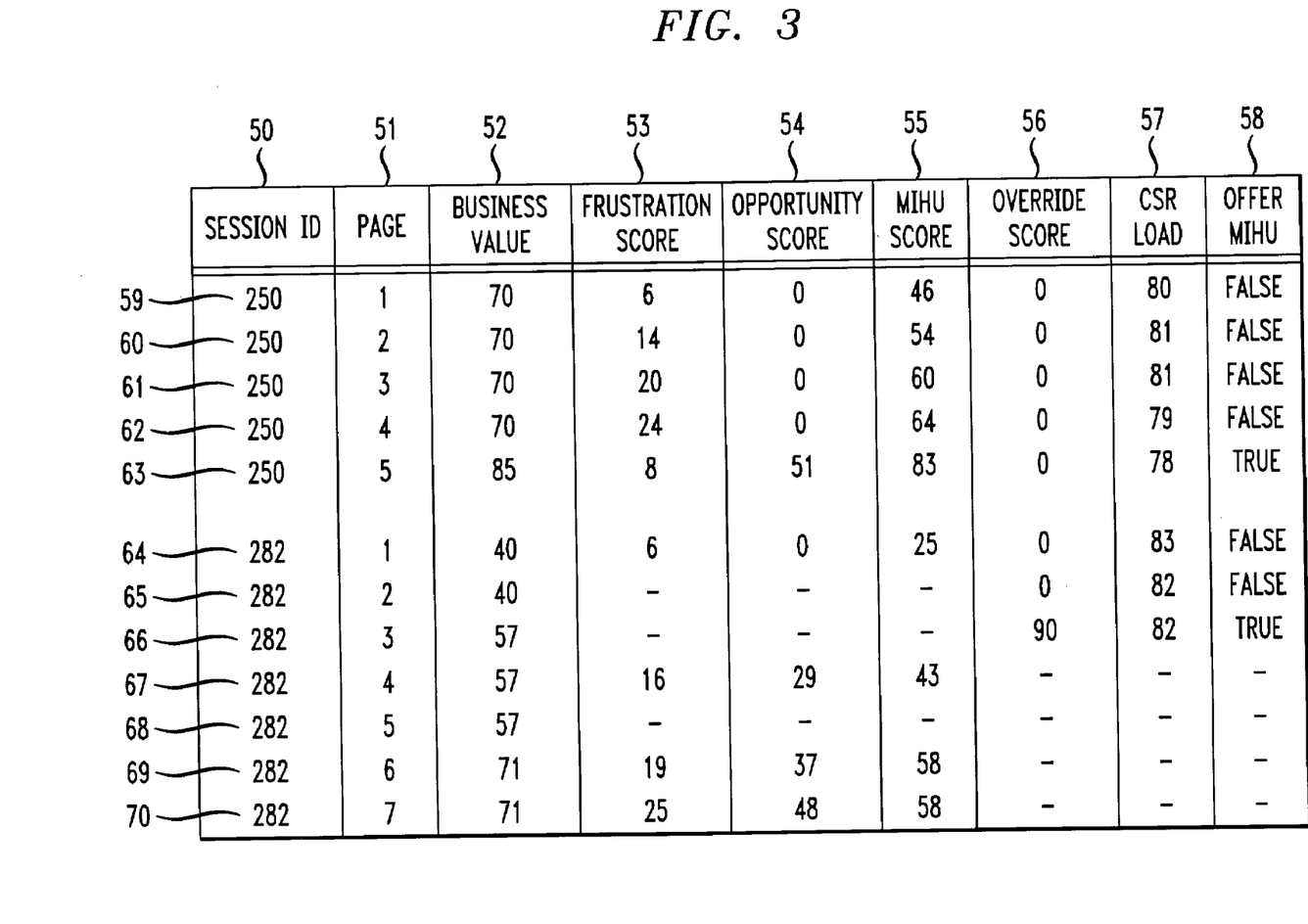
FIG. 3 is a diagram illustrating report data associated with MIHU decisions according to an embodiment of the invention.

We now use FIG. 3 to explain how the MIHU decision flow operates. This figure shows a report presenting some representative decisions reached by the decision engine 20 (FIG. 1). The columns of this report correspond to some of the most important attributes of the decision flow, and each row corresponds to a single execution of the decision flow. As shown, the columns include a session ID 50, page number 51, business value 52, frustration score 53, opportunity score 54, MIHU score 55, override score 56, CSR load value 57, and offer MIHU value 58.

During a single execution, the value 58 of offer MIHU is based on three intermediate attributes: MIHU score 55; MIHU override score 56; and CSR load 57. In the example, if either of the scores 55 or 56 is greater than the CSR load value, then the MIHU functionality is offered (value=true).

The MIHU score attribute is based on other intermediate attributes, which focus on the current business value of the customer and session (value 52), on the estimated frustration level of the customer (score 53), and on the estimated opportunity for making money from the customer (score 54) either by encouraging the customer to purchase the contents of the shopping cart, or through a cross-sell or up-sell. The frustration score and opportunity scores in turn may depend on additional intermediate attributes.

Referring still to FIG. 3, the first five rows 59 through 63 show how the different scoring attributes might vary over a user session. We assume in this example that the customer visited 5 pages (as indicated by column 51), and placed something in the shopping cart when sending the 4th page back to the web storefront (as indicated by row 62). In the decision flow used to generate this example, the frustration score 53 goes up (as indicated by rows 59 through 62), except when the customer places something in the shopping cart. The intuition here is that customer frustration goes down (as indicated by score 53 in row 63) if there is a feeling of progress, e.g., after several searches a product is found and put in the shopping cart. On the other hand, the opportunity score generally goes up when something goes into the shopping cart (as indicated by score 54 in row 63), both because there is something in the shopping cart, and in some cases there are possibilities for cross-sells and up-sells.

Of course, the specific behavior of the attributes in a decision flow is determined by the business analysts and managers who program it. As a result, the decision flow for MIHU described here can be adapted to encompass any principles and heuristics that a business manager wants.

A key feature of decision flows is the use of "enabling conditions" or guards on the execution of attributes, modules, and external functions. For example, the "determine MIHU score" module (module 40 of FIG. 2) has as an enabling condition, expressed informally, that the module will be executed if the current business value 52 is greater than seventy, and otherwise on every third page of the web session. Likewise, the "determine whether to offer MIHU" module (module 46 of FIG. 2) is executed only if the MIHU option has not yet been offered to the customer.

Session 282 in FIG. 3, represented by rows 64 through 70, illustrates how the enabling condition on determine MIHU score impacts decision flow executions. In this session, the current business value 52 is less than or equal to seventy, and so the determine MIHU score is not executed on the 2nd, 3rd or 5th pages (as indicated by value 52 and score 55 in rows 65, 66 and 68, respectively). On the 6th page, the current business value goes above seventy (as indicated by value 52 in row 69). Therefore, the determine MIHU score is computed for the 6th and 7th page (as indicated by value 55 in rows 69 and 70, respectively).

Enabling conditions are useful in at least three contexts: (a) to permit savings on resource usage (as illustrated above); (b) to avoid the computation of irrelevant attributes (e.g., once MIHU has been offered there is no need to compute offer MIHU); and (c) to indicate which attributes should be ignored if a real-time constraint is about to be violated.

What happens if an attribute that has been disabled is referred to by the computation of some other attribute? One design principle of decision flows is that any attribute may have null value, and that any attribute computation must be able to work with null inputs. This is motivated in part by the observation that data retrieval over a network is not reliable, and that many decisions must be made using partial information. Suppose in the example that the MIHU option has not been offered yet. Even if the determine MIHU score module is disabled, i.e., not evaluated, the rest of the decision flow will be executed, and a final value for offer MIHU will be obtained. The condition language used in decision flows can test whether an attribute has been disabled (i.e., the enabling condition is false). Importantly, both the condition language and the attribute computation language used in decision flows work in the context of partial information and null values.

Declarative semantics are associated with decision flows. Under these semantics, decision flows are viewed as input-output devices, which map a given set of source attribute values (and an underlying environment, such as any databases accessed) to a given set of target attribute values. It turns out that given a set of source attribute values (and a fixed underlying environment), a well-formed decision flow uniquely determines the values of the target attributes.

A key factor in achieving this declarative semantics is that decision flows satisfy a certain acyclicity property. In particular, a graph can be formed for each module M, where the nodes are the top layer modules, attributes, and external functions of M, and which contains an edge from node A to node B if: (i) an attribute defined in A is used in the computation of B (data flow); or (ii) an attribute defined in A is used in the enabling condition of B (enabling flow). For a decision flow to be well-formed, this graph must be acyclic for each module. In operational terms, the acyclicity condition implies that there will not be race conditions between different attributes being evaluated. Further, the acyclicity condition underlies the advantage that decision flows are easier to understand than expert systems, and suffer less from the ripple effect.

There are at least three advantages to the declarative semantics just outlined. First, the semantics provide a clear and unambiguous meaning for Vortex decision flows. Second, people developing Vortex decision flows can largely ignore flow of control issues, and focus instead on the business logic they are trying to express. This provides a key difference between decision flows and conventional flowcharts. A Vortex compiler will alert the user if the acyclicity condition is violated. And third, the declarative semantics afford optimizations, of both response time and system throughput.

B. Attribute Rules and Combining Policies

Another key feature of the decision flow paradigm is the flexibility given to users when specifying how an attribute should be computed. In addition to permitting external function calls (e.g., database dips, or calls to execute in a different decision support engine), the paradigm supports the use of attribute rules and combining policies.

Two illustrations are provided in FIG. 4, which shows the contents 72 of the current business value 32, and the contents 74 of a weighted promotion (promo) list attribute 45 (which is computed in accordance with the "determine opportunity score" module 44). As shown in list 72, a family of rules is associated with attribute current business value, each potentially contributing a number. Numbers contributed by rules with true condition are combined by summation. In the example, rules contribute values of forty, twenty six and twenty, resulting in final value of eighty six.

The attribute weighted promo list 74 illustrates a more interesting combining policy. The output of this module will hold a list of promo items, ordered according to how well they fit the current situation. The individual rules contribute ordered pairs, consisting of a promo item along with a numeric weight (e.g., <umbrella, 40 >). As illustrated by the second and fourth rules here, several rules might contribute to the same promo item. The combining policy for this module is to group contributed pairs by promo item, then add the weights for each promo item, and finally sort the list of resulting pairs according to the aggregated weights.

More generally, the decision flow paradigm offers a broad range of combining policies for aggregating the contributions of a rule set. Other combining policies involving numbers include maximum, minimum and average. As illustrated with the weighted promo list, the contributed values and the result may have a structured type. In addition to supporting a family of combining policies, the engine supports an OQL-like (object query language-like) algebra for specifying customized combining policies.

The presence of multiple combining policies permits the use of different styles of reasoning within the decision flow paradigm. Decision flows also support different styles of reasoning at a more granular level as well. We illustrate this in connection with the attributes MIHU score and MIHU override score. We have discussed how MIHU score involves a deliberate derivation involving many factors. In contrast, the attribute MIHU override score is computed by an atomic node that includes collection of simple and disjoint factors (e.g., that a particular item is in the shopping cart, or that a certain page has been visited) and uses as combining policy "maximum contributed value." If MIHU override score is greater than CSR load, then the MIHU option will be offered, and so each rule in MIHU override score is analogous to a presidential veto or gubinatorial pardon. For example, in the second session of FIG. 3 (session 282), the MIHU override score goes to ninety on the 3rd page (as indicated by score 56 in row 66), perhaps because a leather coat was placed into the shopping cart; and this triggers the offer of MIHU.

Next, we discuss further details about the Vortex decision engine in the context of items (a) through (j), mentioned above, that would be desirable in such a decision support engine.

It is evident from the preceding description that the rule-based language used by the Vortex engine satisfies items (a) through (g).

Turning to item (h), the "attribute-centric" nature of decision flows makes possible reports about how or why decisions were made that are conceptually close to the decision flow specification. In particular, reports such as the one shown in FIG. 3 can be created using some or all of the attributes derived by the decision flow. Given a family of decisions, a user can inspect this report (either manually or using automated techniques such as regression analysis or data mining) to see whether the various attributes and criteria are given appropriate emphasis. If anomalies are found, then it is relatively easy to find the corresponding places in the decision flow that should be modified. Furthermore, this close correspondence between reports and decision flow structure facilitates the development of self-learning tools that work on top of the Vortex language.

Decision flows reveal the key factors involved in making a decision or evaluation, and hide a substantial amount of detail about the execution. In contrast, when specifying an equivalent decision using a conventional flowchart or Petri Net formalism, the key factors and logic are obscured by the "plumbing." In Decision flows, different ways of executing rules can co-exist. This contrasts with logic programming languages and conventional expert systems, which have single execution semantics, and force the use of awkward simulations if rules are to be combined in a different way. It is these considerations along with the correspondence between reports and the structure of decision flows that satisfies item (h).

Figure 5:
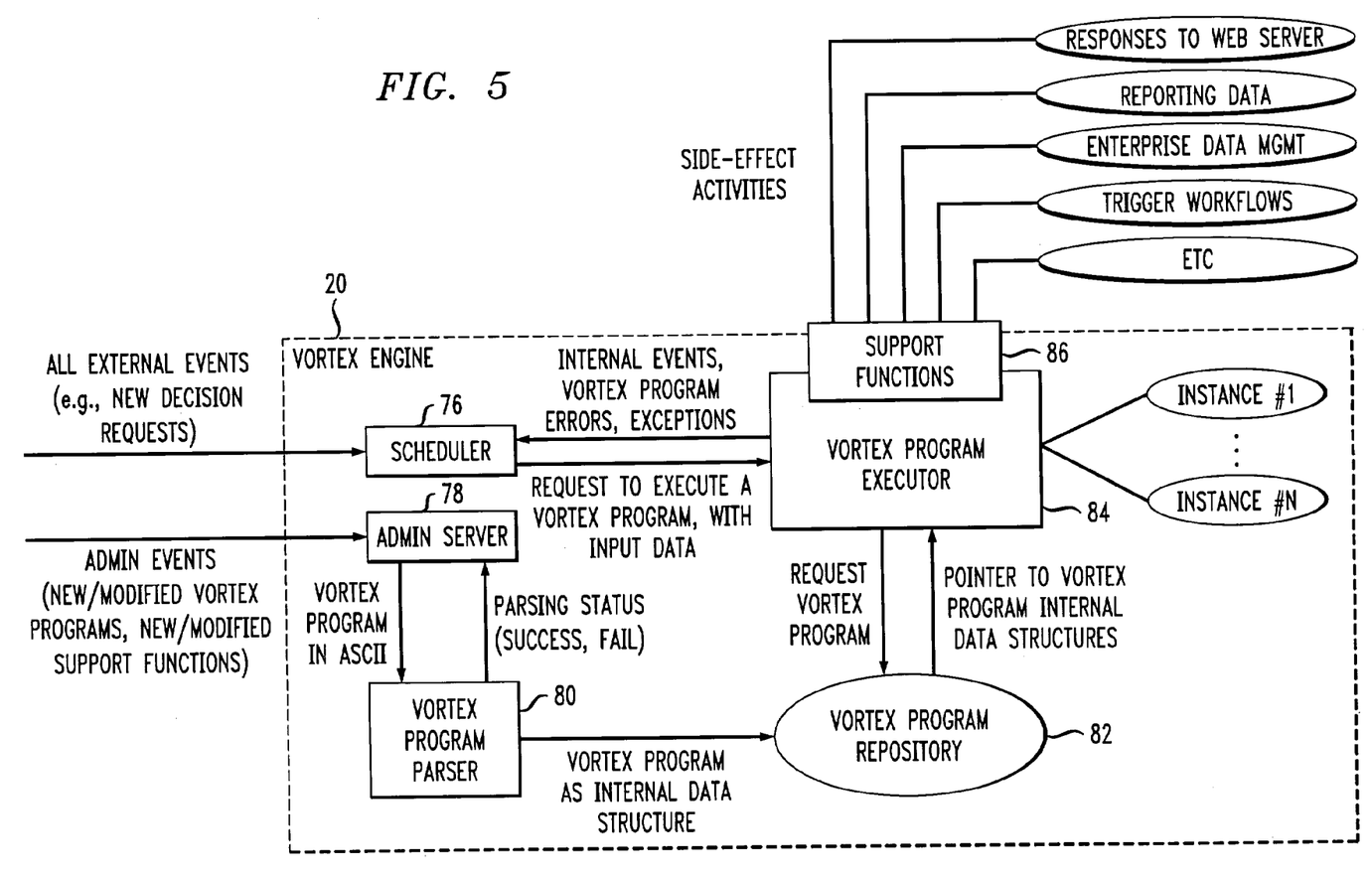
FIG. 5 is a block/flow diagram illustrating an on-line decision engine according to an embodiment of the invention.

We turn now to item (j). FIG. 5 shows an illustrative architecture of a Vortex decision engine which may be employed as the on-line decision engine 20 of the MIHU system 10 in FIG. 1. As shown, the engine 20 comprises a scheduler 76, an administrative server 78, a program parser 80, a program repository 82, and a program executor 84 and associated support functions 86.

Vortex-based programs (new or modified) are input into the administrative server 78, which invokes the program parser 80. The program in ASCII form is passed to the parser 80 which checks that the program is well-formed and compiles the program into an internal data structure. The parser may give the administrative server an indication of the success or failure of the parsing operation. When the program is to be executed by the program executor 84, i.e., when a decision is to be made based on given input parameters, a copy of the data structure is created, and that copy is then interpreted.

As a result, the Vortex program can be modified, parsed, and complied into anew internal data structure. The new data structure can then be stored in the program repository 82 and used for subsequent decisions. In this way, Vortex programs can be modified without bringing the engine down, i.e., without taking the engine off-line. The Vortex engine has been implemented in C++. Furthermore, many of the specific operations of a Vortex program (e.g., arithmetic comparisons, list manipulations, external functions) are performed by "support functions," which are also compiled. Additional support functions can also be added to the engine without bringing it down.

When a new decision request is received by the engine 20, the scheduler 76 sends a request to the program executor 84 to execute a particular program with given input data. The executor 84 then requests the particular program from the repository 82. The repository returns a pointer to the program internal data structure to the executor. The executor may execute the program in accordance with any corresponding support functions 86, such as responses to web server 18 (FIG. 1), reporting data to business analyst/manager 16 (FIG. 1), enterprise data management in accordance with the enterprise database 22, trigger workflows, etc. The executed program results in various program instances 1 through N.

It is to be understood that the Vortex decision engine may maintain logs of active customer sessions in an external database or in an internal database (e.g., a main memory database in the Vortex engine, such that customer sessions can be maintained in main memory but accessed in an associative manner).

With regards to item (k), a GUI may be provided in accordance with the decision engine to support specification of Vortex programs. A visual palette may be provided for the decision flow constructs. The appearance of the palette and GUI may be similar to the representations in FIGS. 2 and 4. Wizards may be provided for building up flowchart nodes, rules, attribute modules, database queries, etc.

It is to be understood that the example MIHU decision flow described above is relatively simple, in terms of the size of the decision flow and the nature of the data being evaluated. Much more complex decision flows maybe created and executed, e.g., ones that involve many modules and over 50 attributes.

III. Integration with Web Servers

Another component of the automated approach to web personalization in accordance with the invention concerns creating a linkage between the on-line decision server 20 and the web server 18 hosting a site. We begin by discussing the kinds of information that need to be passed back and forth between web server and decision engine. We then describe different ways to convey relevant information to the decision engine, and to permit decisions made to have impact on the web server.

A. Information Used by Decision Engine

A preferred web personalization approach of the invention, as described above, is based on providing relevant information to a sophisticated on-line decision engine. This subsection distinguishes between the raw data that can be obtained easily and higher-level semantic information, such as used by the decision flow in the example of section II above.

The on-line decision engine preferably has access to the following kinds of information:

(a) History of customer clicks: This includes not only the web requests that the customer is making, but also the navigation path being followed around the site, the times spent at each page, and the entries made into any forms.

(b) Web server responses: The response of a web storefront to a customer may be very important in understanding the customer experience. For example, to determine frustration stemming from difficult searches, it is important to know about both the number of searches performed and also the sizes of returned answers.

(c) Enterprise data: A broad variety of stored information may be useful to the personalization. At a minimum, this includes accessing information resulting from bulk statistical analyses and information on inventory and availability times. If the customer has been identified, then customer profiles and recent customer histories can also be incorporated into the personalization process.

There is also a higher, semantically rich kind of information that can be helpful as input for the decision engine. This includes information, for example, about the category of page being accessed by the customer (e.g., search request, search answer, catalog entry, shopping cart), or the intent of a page (e.g., that it includes a promotion or indicates that a certain catalog item is out of stock).

Indeed, an important part of installing a MIHU system involves creating or determining a model of the web site, that incorporates relevant models of customers, the intent of their activities on the site, the business value of those activities, indicators that a customer may abandon a transaction, etc.

Typically, the Vortex programs to be executed by the engine 20 are created to reflect that model of the web site. When setting up a MIHU system, someone writes the Vortex program(s), which basically amounts to deciding on the attributes that need to be computed to help make the key decisions, and deciding on the rules that will determine the values of those attributes. Choosing those sets of attributes and rules is based on a conceptual model of the web site (and the different kinds of pages there), a conceptual model of customers (and how their behavior can be used as a predictor of actions, such as leaving the site before completing a transaction), and a conceptual model of the value of transactions (e.g., the relative merits of closing a sale versus giving the customer a positive experience even without closing a sale versus letting the customer abandon the site in frustration, etc.).

The example of section II provides a detailed description on how such a model is created, but a variety of other factors may be brought into play. This model will be clearly visible in the program driving the decision engine, and will help to guide the kinds of information that need to be passed from web server to decision engine.

B. Acquiring the Information

Figure 6:
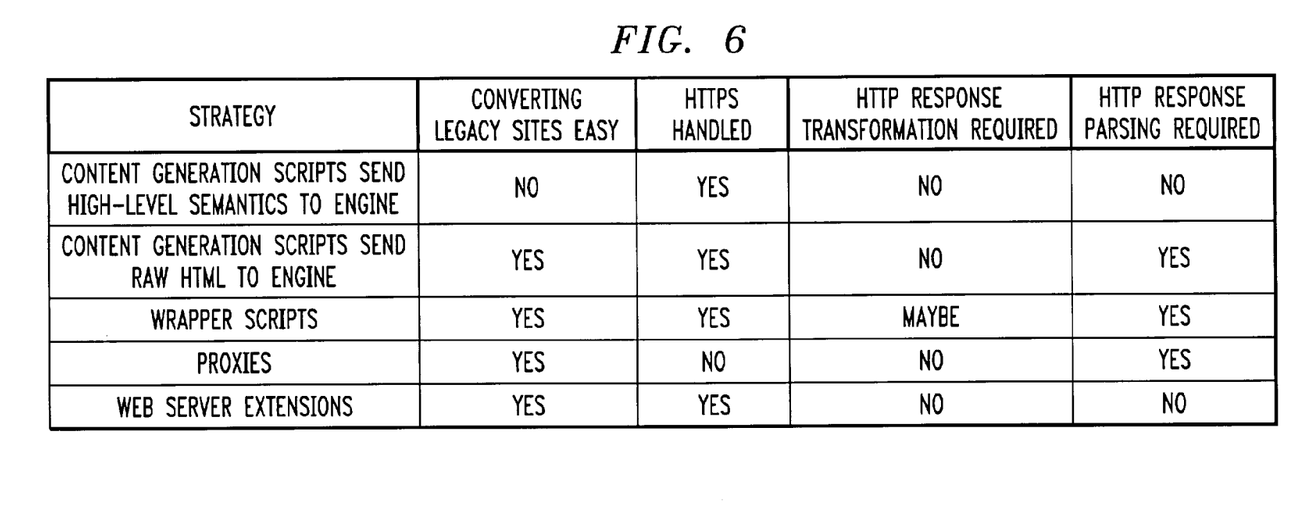
FIG. 6 is a diagram summarizing web interaction monitoring strategies according to various embodiments of the invention.

In this subsection, we present five techniques of gathering session information used by the decision engine. A summary is presented in FIG. 6. It is to be understood that one or more of these techniques may be employed in accordance with the present invention. Additional techniques may also be employed to gather session information used by the decision engine.

In order to extract high-level semantic information about the customer and his interactions with the web site, the present invention proposes modifying the content generation scripts associated with the HTML web pages of the e-commerce applications themselves. We now discuss five illustrative techniques that may be employed in this context:

(i) Content generation scripts send high-level semantics to decision engine. Assuming that all pages that need to be tracked are generated via executable scripts/programs (which is a reasonable assumption to make for large sites), an approach to obtaining meaningful semantic information is to create or modify these scripts to gather/create the desired information, and then pass it on to the decision engine. One advantage of this approach is that the people developing the web pages will have the best idea of the intended semantics of the pages, and thus what the decision engine should receive. Further advantages are that the actual HTTP (HyperText Transport Protocol) requests and responses do not need to be transformed/parsed, and HTTPS connections can be handled.

(ii) Content generation scripts send raw HTML to decision engine. This is a variation of the approach mentioned above, however, in this case, only the raw HTTP requests/responses are forwarded by the scripts. This can be done by injecting the same (small) block of code into the scripts that generate each and every page of the web site. An advantage is that converting a legacy site to this approach is straightforward (assuming that it was implemented with server-side scripting language such as JSP or ASP), since the only function the extra piece of code performs is to forward appropriate data (HTTP request and/or response) to the decision engine.

(iii) Wrapper scripts. The concept here is that the web server can be configured so that all web requests and responses (that need to be tracked) are filtered through executable scripts that perform the task of extracting the relevant information and contacting the Vortex engine to determine the appropriate response. Note that these wrapper scripts may reside on the web server(s) that are supporting page requests, or may reside on separate machines. As opposed to the previous approach, an advantage in this scenario is that the actual content generation is not affected, i.e., this method is simply layered on top. Moreover, HTTPS connections can be handled, since the wrapper script gets the customer request after it is decrypted by the server, and parses the response before it is encrypted and sent to the client.

(iv) Proxies. A proxy can be inserted between a company's web site and the end user. The proxy is responsible for tracking user requests, extracting the site responses, and contacting the decision engine to determine the appropriate intervention strategy. An advantage is that HTML page transformation is not required.

(v) Web Server Extensions. Most popular web servers (Apache, Netscape Enterprise, Microsoft IIS) have an application programming interface or API (Apache modules, Netscape's NSAPI, Microsoft's ISAPI) that can be used to extend the functionality provided by the server. In particular, these can be used to attach monitoring hooks into the web server itself, thus gaining low-level access to all web interactions. The advantage is that no transformation of the HTML response being generated is required, and secure connections can be handled.

Three of the above techniques are commonly used for tracking a session in web sites: encoding the session ID into the URLs (uniform resource locators) sent and requested by the customer, placing cookies on the customer machine, and placing the session ID into a hidden form field. The latter technique requires that all pages transmitted to the user are generated via form submissions. In order for the decision engine to know the session of a page request, the session ID must be passed to the engine along with other page information. The session ID can be sent explicitly, or it can be sent as it occurs in the HTML of the requested page, and the encoding scheme used by the web site can be used to extract the session ID.

We now turn to the issue of scalability. In particular, how do the above techniques work when a web site is supported by a web server farm rather than a single web server? There are two main issues. First, in the case of a web server farm, a farm of decision engines may be employed. Because the log of a given customer session will generally be maintained in the main memory of a single decision engine, all decisions about that session should be made by the same decision engine, even if different web servers are being used to serve the pages.

This can be accomplished by encoding a decision engine ID inside the session ID. A load-balancing strategy can be implemented to distribute customer sessions across the decision engines. Furthermore, in applications such as MIHU, if all of the decision engines reach saturation, then the system can decide for some customers that they will not receive any MIHU decisions. This permits a graceful degradation of service in the face of unexpectedly high load.

The second scalability issue concerns how the added expense of transmitting information from web server to the decision engine will impact performance. In all cases except for proxies, the processing involved in transmitting to the decision engine can be performed on the web server.

C. Impacting the Web Site

So far, we have focused on tracking the user experience and using the on-line decision engine to recommend how the customer experience should be impacted. We now discuss the kinds of recommendations that can be made, and how they can be acted upon.

In one embodiment, an icon or image can be placed on a page transmitted to the customer. The image may either correspond to a promotion, or may even offer the customer live agent help (e.g., for web sites with call centers). If the customer clicks on the image, the web server assigns a live agent to interact with the customer.

The decision engine may also generate entire pages or frames. For example, the Vortex engine may be used to choose from a number of parameterized page templates, and then choose values for the parameters. In this way, simple automated conversations with the customer can be performed.

Figure 7:
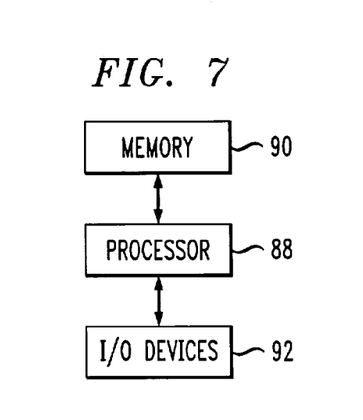
FIG. 7 is a block diagram illustrating a generalized hardware architecture of a computer system suitable for implementing the various functional components/modules of a MIHU system of the invention.

Turning now to FIG. 7, a block diagram illustrates a generalized hardware architecture of a computer system suitable for implementing the various functional components/modules of a MIHU system of the invention, as depicted in the figures and explained in detail herein. That is, the hardware architecture illustrated in FIG. 7 may be employed to implement each web server 18, each on-line decision engine 20, each enterprise database 22, and each web client 24 and 26. It is to be understood that more than one of the individual components of the MIHU system may be implemented on one such computer system.

As shown, the computer system may be implemented in accordance with a processor 88, a memory 90 and I/O devices 92. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data to the processing unit, and/or one or more output devices (e.g., CRT display, printer, etc.) for presenting results associated with the processing unit. For example, user interfaces of the system employed by a customer, a CSR, and an analyst may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Thus, in the case where each component of a MIHU system is implemented on its own computer system, one or more software programs for implementing the component's individual functionality are stored on the computer system and, when ready to be utilized, loaded and executed therein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. An automated method for use in accordance with a user-interactive business-related processing system, the method comprising the automated steps of:

monitoring one or more interactions a user has with one or more applications associated with the business-related processing system;

processing data obtained in association with the monitoring operation to compute a decision value representative of whether or not the user may need intervention with respect to the one or more applications, wherein the decision value is computed in accordance with a decision policy based on a combination of formal and heuristic reasoning, and further wherein the computed decision value is based on one or more attributes comprising at least one of: (i) an attribute representative of a business value associated with the user or the one or more applications; (ii) an attribute representative of a frustration level attributable to the user with respect to the one or more interactions; (iii) an attribute representative of an estimated profit opportunity associated with the user; and (iv) an attribute representative of availability of resources capable of taking the action;
proactively offering the intervention to the user when the computed decision value represents a result indicative that the user is likely to need the intervention; and
an individual monitoring one or more computed decision values, and the individual adjusting the decision policy, when necessary or desired, so as to improve business-related performance, wherein the individual is able to adjust the decision policy without a need for programming expertise.

2. The method of claim 1, wherein the proactively offered intervention comprises assistance provided by an individual through a communication channel established between the user and the individual in accordance with the user-interactive processing system.

3. The method of claim 2, wherein the communication channel comprises a connection over a standard telephone line.

4. The method of claim 2, wherein the communication channel comprises a connection over a network with which the user interacts with the one or more applications of the processing system.

5. The method of claim 1, wherein the user-interactive processing system comprises one or more servers having one or more electronic commerce-based applications executing in association therewith.

6. The method of claim 5, wherein the one or more electronic commerce-based applications comprise a web storefront.

7. The method of claim 1, wherein the user-interactive processing system comprises an interactive voice response system.

8. The method of claim 1, wherein the user-interactive processing system comprises a workflow system.

9. Apparatus for use in accordance with a user-interactive business-related processing system, the apparatus comprising:
at least one processor coupled to the user-interactive business-related processing system and operative to: (i) process data obtained in association with one or more interactions a user has with one or more applications associated with the business-related processing system to compute a decision value representative of whether or not the user may need intervention with respect to the one or more applications, wherein the decision value is computed in accordance with a decision policy based on a combination of formal and heuristic reasoning, and further wherein the computed decision value is based on one or more attributes comprising at least one of: (i) an attribute representative of a business value associated with the user or the one or more applications; (ii) an attribute representative of a frustration level attributable to the user with respect to the one or more interactions; (iii) an attribute representative of an estimated profit opportunity associated with the user; and (iv) an attribute representative of availability of resources capable of taking the action; (ii) proactively cause the offering of the intervention to the user when the computed decision value represents a result indicative that the user is likely to need the intervention; and (iii) permit an individual to monitor one or more computed decision values, and to adjust the decision policy, when necessary or desired, so as to improve business-related performance wherein the individual is able to adjust the decision policy without a need for programming expertise; and memory, coupled to the at least one processor, for storing at least one of the obtained data and the computed decision value.

10. The apparatus of claim 9, wherein the data obtained is one of raw data and semantic information.

11. The apparatus of claim 9, wherein the user-interactive processing system comprises one or more servers having one or more electronic commerce-based applications executing in association therewith.

12. The apparatus of claim 9, wherein the user-interactive processing system comprises an interactive voice response system.

13. The apparatus of claim 9, wherein the user-interactive processing system comprises a workflow system.

14. A network-based system, the system comprising:
at least one server operative to execute one or more electronic commerce-based applications for use by at least one customer via a network; and
at least one decision engine coupled to the at least one server and operative to: (i) process data obtained in association with one or more interactions the customer has with the one or more electronic commerce-based applications to compute a decision value representative of whether or not an action should be taken with respect to the customer, wherein the decision value is computed in accordance with a decision policy based on a combination of formal and heuristic reasoning, wherein the computed decision value is based on one or more attributes comprising at least one of: (a) an attribute representative of a business value associated with the customer or the one or more applications; (b) an attribute representative of a frustration level attributable to the customer with respect to the one or more interactions; (c) an attribute representative of an estimated profit opportunity associated with the customer; and (d) an attribute representative of availability of resources capable of taking the action; and (ii) proactively taking the action with respect to the customer when the computed decision value represents a result indicative that the action should be taken with respect to the customer;
wherein the decision engine permits an individual to monitor one or more computed decision values, and to adjust the decision policy, when necessary or desired, so as to improve business-related performance, and further wherein the individual is able to adjust the decision policy without a need for programming expertise.

15. The system of claim 14, wherein the proactively taken action comprises offering assistance provided by a customer service representative through a communication channel established between the customer and the customer service representative in accordance with the at least one server.

16. The system of claim 14, wherein the proactively taken action comprises presenting to the user data relevant to the one or more electronic commerce-based applications, wherein the relevant data is related to options available to the customer.

17. The system of claim 14, further comprising one or more client computing devices coupled to the at least one server for use by the customer in interacting with the at least one server.

18. The system of claim 14, further comprising at least one database coupled to the at least one decision engine for use in obtaining data to be processed by the decision engine.

19. The system of claim 14, wherein the data network comprises the Internet.

20. An article of manufacture for use in accordance with a user-interactive business-related processing system, the article comprising [a machine readable medium containing one or more programs which when executed] a computer readable medium encoded with a computer program executed by a computer to implement the steps of:

processing data obtained in association with one or more interactions a user has with one or more applications associated with the business-related processing system to compute a decision value representative of whether or not the user may need intervention with respect to the one or more applications, wherein the decision value is computed in accordance with a decision policy based on a combination of formal and heuristic reasoning, and further wherein the computed decision value is based on one or more attributes comprising at least one of: (i) an attribute representative of a business value associated with the user or the one or more applications; (ii) an attribute representative of a frustration level attributable to the user with respect to the one or more interactions; (iii) an attribute representative of an estimated profit opportunity associated with the user; and (iv) an attribute representative of availability of resources capable of taking the action;

proactively causing the offering of the intervention to the user when the computed decision value represents a result indicative that the user is likely to need the intervention; and permitting an individual to monitor one or more computed decision values, and adjust the decision policy, when necessary or desired, so as to improve business-related performance, wherein the individual is able to adjust the decision policy without a need for programming expertise.

* * * * *